(12) United States Patent
Okabe et al.

(10) Patent No.: US 9,346,123 B2
(45) Date of Patent: May 24, 2016

(54) DEVICE TO IMPROVE IRON LOSS PROPERTIES OF GRAIN ORIENTED ELECTRICAL STEEL SHEET AND METHOD FOR IMPROVING IRON LOSS PROPERTIES OF GRAIN ORIENTED ELECTRICAL STEEL SHEET

(75) Inventors: Seiji Okabe, Tokyo (JP); Hiroi Yamaguchi, Tokyo (JP); Takeshi Omura, Tokyo (JP)

(73) Assignee: JFE Steel Corporation (JP)

(*) Notice: Subject to any disclaimer, the term of this patent is extended or adjusted under 35 U.S.C. 154(b) by 752 days.

(21) Appl. No.: 13/806,926

(22) PCT Filed: Jun. 29, 2011

(86) PCT No.: PCT/JP2011/003714
§ 371 (c)(1),
(2), (4) Date: Jan. 31, 2013

(87) PCT Pub. No.: WO2012/001965
PCT Pub. Date: Jan. 5, 2012

(65) Prior Publication Data
US 2013/0161301 A1    Jun. 27, 2013

(30) Foreign Application Priority Data
Jun. 30, 2010    (JP) .................. 2010-150173

(51) Int. Cl.
*B23K 26/00*    (2014.01)
*B23K 26/08*    (2014.01)
(Continued)

(52) U.S. Cl.
CPC ............. *B23K 26/0009* (2013.01); *B23K 26/00* (2013.01); *B23K 26/0846* (2013.01);
(Continued)

(58) Field of Classification Search
CPC ............... B23K 26/0845; B23K 26/00; B23K 26/0009; B23K 2203/04; B23K 2201/16; C21D 8/12; C21D 8/1272; C21D 8/1294; C21D 10/00; C22C 38/00; C22C 38/04; C22C 38/60
USPC ............... 219/121.63, 121.68, 121.69, 121.7, 219/121.72; 148/100, 111
See application file for complete search history.

(56) References Cited

U.S. PATENT DOCUMENTS

| 5,601,662 A * | 2/1997 | Hirai | G01L 3/102 |
| | | | 148/100 |
| 6,567,219 B1 * | 5/2003 | Tanaka | B23K 26/0613 |
| | | | 359/619 |
| 2005/0277270 A1 * | 12/2005 | Yoshikawa | B23K 26/16 |
| | | | 438/463 |

FOREIGN PATENT DOCUMENTS

| JP | 57-002252 B2 | 1/1982 |
| JP | 58-187290 A | 11/1983 |

(Continued)

OTHER PUBLICATIONS

English translation of Japanese Office Action dated Apr. 1, 2014 from corresponding Japanese Patent Application No. 2010-150173.

*Primary Examiner* — Thien S Tran
(74) *Attorney, Agent, or Firm* — DLA Piper LLP (US)

(57) ABSTRACT

A device reduces dust for safely preventing laser-irradiation capacity from decreasing due to contamination and reliably reducing iron loss of a grain oriented electrical steel sheet. The device improves iron loss properties of a grain oriented electrical steel sheet by irradiating its surface with laser to reduce iron loss, wherein, distance between a laser beam emission port and a laser irradiation point is L (mm); laser irradiation angle formed by a line linking the emission port and the irradiation point with respect to a direction vertical to the sheet is θ (°); and L≥50, the emission port is positioned such that L and θ satisfy: 60−0.3L≤θ≤60 when L≤100; 40−0.1L≤θ≤60 when 100<L≤400; θ≤60 when L>400.

2 Claims, 2 Drawing Sheets

(51) Int. Cl.
| | |
|---|---|
| *C21D 8/12* | (2006.01) |
| *C21D 10/00* | (2006.01) |
| *C22C 38/00* | (2006.01) |
| *C22C 38/04* | (2006.01) |
| *C22C 38/60* | (2006.01) |
| *C22C 38/02* | (2006.01) |
| *C22C 38/08* | (2006.01) |
| *C22C 38/12* | (2006.01) |
| *C22C 38/16* | (2006.01) |
| *C22C 38/18* | (2006.01) |

(52) U.S. Cl.
CPC ............... *C21D 8/12* (2013.01); *C21D 8/1272* (2013.01); *C21D 8/1294* (2013.01); *C21D 10/00* (2013.01); *C22C 38/00* (2013.01); *C22C 38/002* (2013.01); *C22C 38/008* (2013.01); *C22C 38/02* (2013.01); *C22C 38/04* (2013.01); *C22C 38/08* (2013.01); *C22C 38/12* (2013.01); *C22C 38/16* (2013.01); *C22C 38/18* (2013.01); *C22C 38/60* (2013.01); *B23K 2201/16* (2013.01); *B23K 2203/04* (2013.01); *C21D 2201/05* (2013.01)

(56) References Cited

FOREIGN PATENT DOCUMENTS

| | | |
|---|---|---|
| JP | 59-197525 A | 11/1984 |
| JP | 3-234388 A | 10/1991 |
| JP | 10-204533 A | 8/1998 |
| JP | 11-279645 A | 10/1999 |
| JP | 2006-117964 A | 5/2006 |

\* cited by examiner

DEVICE TO IMPROVE IRON LOSS PROPERTIES OF GRAIN ORIENTED ELECTRICAL STEEL SHEET AND METHOD FOR IMPROVING IRON LOSS PROPERTIES OF GRAIN ORIENTED ELECTRICAL STEEL SHEET

RELATED APPLICATIONS

This is a §371 of International Application No. PCT/JP2011/003714, with an international filing date of Jun. 29, 2011 (WO 2012/001965 A1, published Jan. 5, 2012), which is based on Japanese Patent Application No. 2010-150173, filed Jun. 30, 2010, the subject matter of which is incorporated herein by reference.

TECHNICAL FIELD

This disclosure relates to a device to improve iron loss properties of a grain oriented electrical steel sheet, as well as a method for improving iron loss properties of a grain oriented electrical steel sheet, by subjecting the grain oriented electrical steel sheet to magnetic domain refinement.

BACKGROUND

A grain oriented electrical steel sheet is mainly utilized as an iron core of a transformer and required to exhibit superior magnetization characteristics, e.g., low iron loss in particular.

In this regard, it is important to highly accumulate secondary recrystallized grains of a steel sheet in (110)[001] orientation, i.e., what is called "Goss orientation," and reduce impurities in a product steel sheet. However, there are restrictions on controlling crystal grain orientations and reducing impurities in view of production cost. Accordingly, there has been developed a technique of introducing non-uniformity (strain) into a surface of a steel sheet by physical means to subdivide the width of a magnetic domain to reduce iron loss, i.e., a magnetic domain refinement technique.

For example, JP-B 57-002252 proposes a technique of irradiating a steel sheet as a finished product with a laser to introduce linear high-dislocation density regions into a surface layer of the steel sheet, thereby narrowing magnetic domain widths and reducing iron loss of the steel sheet. The magnetic domain refinement technique using laser irradiation of JP '252 was improved thereafter (see JP-A 2006-117964, JP-A 10-204533, JP-A 11-279645 and the like), so that a grain oriented electrical steel sheet having good iron loss properties can be obtained.

However, there arises a problem during the laser irradiation described above in that dust produced from a surface of a steel sheet thus laser-irradiated contaminates the laser beam irradiator. In view of this problem, JP-A 58-187290 proposes a technique of protecting a laser beam emission port of a laser beam irradiator with a cover glass and provides a gas injector on one side of the laser beam irradiator and an air-sucker to the other side so that dust flows to the sucker and is removed by suction to prevent the optical control unit of the laser beam irradiator from being contaminated.

There are, however, limits on preventing dust contamination when the prevention is pursued solely by such gas flow as described above. In a case of a long-time continuous laser irradiation exceeding 24 hours, for example, there still arises a problem that the cover glass needs to be cleaned thereafter. Further, there exists a problem in the technique of JP '290 that a significantly large amount of electricity is needed when the sucker having a high air-sucking rate of 7 m$^3$/minute as shown in the Examples thereof is operated.

It could therefore be helpful to provide a device and a method capable of solving the aforementioned problems of dust produced by laser irradiation, which problems cannot be sufficiently solved by the conventional dust retrieval by gas flow, safely preventing laser-irradiation capacity from decreasing due to contamination, and thus reliably reducing iron loss of a grain oriented electrical steel sheet.

SUMMARY

We thus provide:

(1) A device to improve iron loss properties of a grain oriented electrical steel sheet having subjected to finish annealing, by irradiating a surface of the grain oriented electrical steel sheet with laser to reduce iron loss of the electrical steel sheet, wherein, provided that: distance between a laser beam emission port of a laser beam irradiator emitting the laser and a laser beam irradiation point on the electrical steel sheet is L (mm); laser beam irradiation angle formed by a line linking the laser beam emission port and the laser beam irradiation point with respect to a direction vertical to the electrical steel sheet is θ (°); and L≥50, the laser beam emission port is positioned such that L and θ satisfy following formulae:

$$60-0.3L \leq \theta \leq 60 \text{ when } L \leq 100$$

$$40-0.1L \leq \theta \leq 60 \text{ when } 100 < L \leq 400$$

$$\theta \leq 60 \text{ when } L > 400.$$

(2) A method for improving iron loss properties of a grain oriented electrical steel sheet having subjected to finish annealing, by irradiating a surface of the grain oriented electrical steel sheet with laser to reduce iron loss of the electrical steel sheet, wherein, provided that: distance between a laser beam emission port of a laser beam irradiator emitting the laser and a laser beam irradiation point on the electrical steel sheet is L (mm); laser beam irradiation angle formed by a line linking the laser beam emission port and the laser beam irradiation point with respect to a direction vertical to the electrical steel sheet is θ (°); and L≥50, the method comprises positioning the laser beam emission port such that L and θ satisfy following formulae:

$$60-0.3L \leq \theta \leq 60 \text{ when } L \leq 100$$

$$40-0.1L \leq \theta \leq 60 \text{ when } 100 < L \leq 400$$

$$\theta \leq 60 \text{ when } L > 400.$$

It is possible to eliminate undue influence of dust produced by laser irradiation without deteriorating an iron-loss reducing effect by the laser irradiation, by retracting a laser beam irradiator to a selected position and carrying out the irradiation from there. As a result, laser irradiation treatment for a steel sheet can be stably carried out for a long period, whereby iron loss of the steel sheet can be reliably reduced by the laser irradiation treatment.

REFERENCE SIGNS LIST

Figure 1:
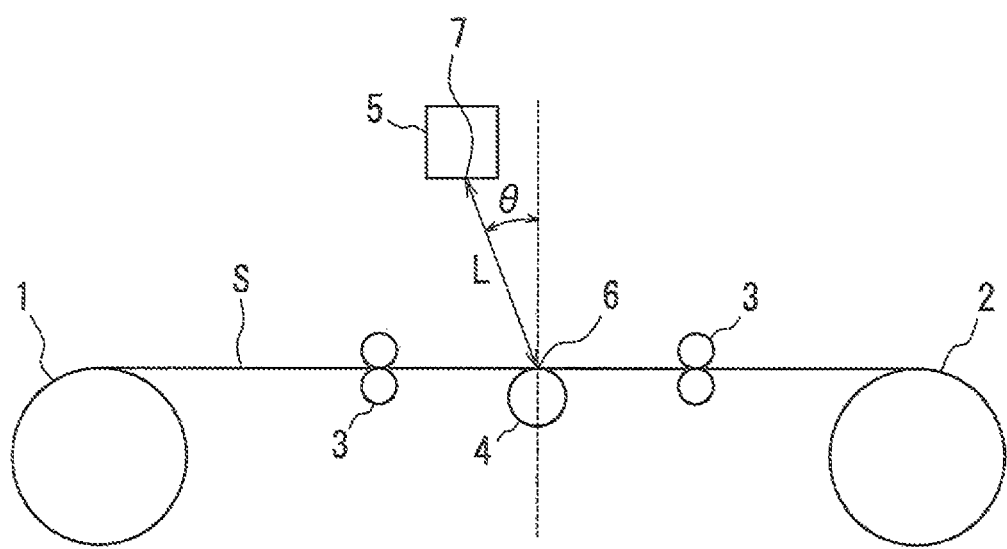
FIG. 1 is a view showing a device to improve iron loss properties.

S Steel sheet
1 Pay-off reel
2 Tension reel
3 Pinch roll
4 Support roll
5 Laser beam irradiator
6 Laser beam emission port
7 Laser beam irradiation point

DETAILED DESCRIPTION

Dust, produced when a surface of a grain oriented electrical steel sheet having been subjected to finish annealing is irradiated with a laser beam, splashes most vigorously in the vertical direction with respect to the steel sheet because evaporation occurring on a coated surface of the steel sheet triggers formation of the dust. Accordingly, contamination by dust most significantly occurs when a laser beam irradiator (precisely, a laser beam emission port (point)) is situated right above a laser beam irradiation point on a steel sheet and the smaller distance between the steel sheet and the laser beam irradiator results in the higher possibility of the steel sheet being contaminated. Further, contamination of the laser beam irradiator cannot be completely prevented if the laser beam irradiator is retracted from the position right above the laser irradiation point on the steel sheet.

We therefore addressed how dust produced by laser irradiation upon a grain oriented electrical steel sheet diffuses and discovered that the position of a laser beam irradiator where the irradiator can safely avoid undue influence by diffused dust, without losing a good iron-loss reducing effect by laser irradiation thereof, can be deduced from correlation between: distance between a laser beam emission port and a laser beam irradiation point; and the laser beam irradiation angle.

It is important when a surface of a grain oriented electrical steel sheet S having been subjected to finish annealing (which steel sheet will be referred to simply as an "(electrical) steel sheet" hereinafter) is irradiated with a laser emitted from a laser beam irradiator 5 so that iron loss of the electrical steel sheet is reduced by magnetic domain refinement in a process of winding the steel sheet S out of a pay-off reel 1 and taking the steel sheet up on a tension reel 2 via pinch rolls 3 and a support roll 4, to set distance L (mm) to be at least 50 (mm) provided that: distance between a laser beam emission port 7 of the laser beam irradiator 5 and a laser beam irradiation point 6 on the electrical steel sheet S is L (mm); and the laser beam irradiation angle formed by a line linking the laser beam emission port 7 and the laser beam irradiation point 6 with respect to a direction vertical to the electrical steel sheet is θ (°), as shown in FIG. 1.

Specifically, dust produced by laser irradiation on a surface of the steel sheet S splashes at relatively high initial speed, whereby it is difficult to completely eliminate the possibility of contamination of the laser beam irradiator 5 when distance L, i.e., the distance between the laser beam irradiator and the origin of dust production, is less than 50 mm even if a laser beam irradiation direction is then changed.

Further, it is essential to controllably set the laser beam irradiation angle θ in connection with the distance L such that θ and L satisfy following formulae:

$60 - 0.3L \leq \theta \leq 60$ when $L \leq 100$ $40 - 0.1L \leq \theta \leq 60$ when $100 < L \leq 400$ $\theta \leq 60$ when $L > 400$.

Specifically, contamination of the laser beam irradiator 5 can be reliably prevented by positioning the laser beam irradiator 5 such that the laser beam irradiation angle θ formed by the laser beam irradiation direction with respect to the vertical direction at the laser beam irradiation point 6 increases as the distance L decreases.

In a case where the angle θ is smaller than the lower limit angle in each of the respective ranges of L, the laser beam emission port 7 (generally a cover glass that protects the laser beam irradiator 5) of the laser beam irradiator 5 is susceptible to adhesion of dust and frequent cleaning of the emission port is necessitated. In a case where the angle θ exceeds 60°, the laser beam at the laser beam irradiation point 6 takes on an ellipsoidal, elongated shape, whereby an area where strain is introduced by laser irradiation is too large and iron loss properties are likely to deteriorate in each of the respective ranges of L. Accordingly, the laser beam irradiation angle θ is 60° or less, The upper limit of the distance L is not restricted as long as the laser beam can be concentrated. The larger distance L is the more advantageous in terms of preventing occurrence of contamination. The problem of dust contamination does not occur if the laser beam irradiator 5 is positioned in a direction normal to the steel sheet at the laser beam irradiation point when the distance L exceeds 400 mm (except for the case where the laser beam irradiator 5 is situated right below the laser beam irradiation point 6 and dust drops onto the laser beam emission port 7 of the laser beam irradiator 5).

In general, each laser beam irradiator has a single laser beam emission port and the laser emitted from the laser beam emission port scans a steel sheet at laser beam irradiation points thereon in an optically controlled, manner so that the laser is irradiated linearly along a direction substantially orthogonal to the rolling direction of the steel sheet. Accordingly, the laser beam irradiation angle θ changes as the position of the laser beam irradiation point moves. The distance L and the angle θ need to satisfy the aforementioned conditions or formulae at every laser beam irradiation point irradiated by each laser beam irradiator.

The lower side of a steel sheet S is generally supported by the support roll 4 when the steel sheet S is fed horizontally, as shown in FIG. 1. The steel sheet S may be fed in a state where the steel sheet is inclined with respect to the horizontal direction, although FIG. 1 shows an example where a steel sheet being fed in a horizontal direction is irradiated with a laser. Dust produced by laser irradiation splashes most vigorously in the direction normal to a steel sheet regardless of how the steel sheet is inclined with respect to the horizontal direction. Dust contamination therefore can be reliably prevented by setting the laser beam irradiation angle, formed by a line linking a laser beam emission port of a laser beam irradiator and a laser beam irradiation point on a steel sheet with respect to a direction normal to the steel sheet at the laser beam irradiation point, to be within the selected ranges even in a case where the feeding direction of the steel sheet is inclined with respect to the horizontal direction.

A device, where the laser beam irradiator 5 can be disposed therein at any position with distance L in the range of 50 mm to the mechanical upper limit thereof such that L and θ satisfy the aforementioned formulae, is suitable for the device to improve iron loss properties of a grain oriented electrical steel sheet. Alternatively, either the distance L may be a constant value or the set ranges of L may be narrower than the aforementioned set ranges. Specifically, examples of the device include: a device where distance L<400 mm and a steel sheet surface is irradiated with a laser at the laser beam irradiation angle θ (θ>0°) satisfying the corresponding formulae described above; and a device where a laser oscillator with good beam focusing such as a fiber laser oscillator is used to set L to be at least 400 mm and a steel sheet surface is irradiated with a laser at the laser beam irradiation angle θ (inclusive of 0°) satisfying the corresponding formulae described above.

The larger distance L is more advantageous in terms of reliably preventing dust contamination to realize stable laser irradiation in a relatively wide area. Use of a single mode in laser oscillation is therefore advantageous in terms of laser beam focusing properties.

A device to control gas flow such as a device to carry out blowing/sucking of gas and a device to provide an air curtain may also be used in combination to prevent dust contamination.

The method for improving iron loss properties of a grain oriented electrical steel sheet is applicable to any conventionally known grain oriented electrical steel sheets, but the method need be applied after finish annealing and formation of tension coating processes. Finish annealing for facilitating secondary recrystallization in Goss orientation, formation of tension insulating coating and actual expression of a tension effect by the tension coating, characteristic of a grain oriented electrical steel sheet, each require thermal treatment at relatively high temperature. Such thermal treatment at relatively high temperature, however, relieves or decreases strains introduced to a steel sheet. Finish annealing and formation of a tension coating therefore must be carried out prior to magnetic domain refinement.

Further, it is known that the higher degree of accumulation or alignment in Goss orientation in secondary recrystallization in a grain oriented electrical steel sheet having been subjected to magnetic domain refinement results in the lower iron loss of the electrical steel sheet. $B_8$ (magnetic flux density when a steel sheet is magnetized at 800 A/m) is often used as an index of degree of orientation accumulation of an electrical steel sheet A grain oriented electrical steel sheet preferably exhibits $B_8$ of at least 1.88 T and more preferably $B_8$ of at least 1.92 T.

A tension insulating coating provided on a surface of an electrical steel sheet, or on a forsterite coating formed on a surface of as steel sheet by finish annealing, may be a conventional tension insulating coating. The tension insulating coating is preferably a glassy coating mainly composed of aluminum phosphate/magnesium phosphate and silica.

Means for imparting a steel sheet with thermal strain may be based on the known methods and examples thereof include laser irradiation by pulse oscillation or continuous oscillation of a YAG laser, a $CO_2$ laser, a fiber laser and the like. Our device and method are especially useful, for example, in a case of a Q-switched pulsed laser where the coating instantly evaporates to produce dust due to high peak output. Thermal strain is to be imparted to a steel sheet in a direction inclined by 90° to 60° with respect to the rolling direction in the direction orthogonal to the rolling direction, in particular) in either continuous line-like or one-dot line-like pattern. Such linear, strain-imparted areas are formed iteratively in the rolling direction with an interval of 2 mm to 20 mm (inclusive of 2 mm and 20 mm) therebetween. Depth of plastic strain imparted to a steel sheet is preferably about 5 μm to 40 μm.

Examples of preferable irradiation conditions include irradiating a steel sheet with a laser beam with output of a Q-switched pulsed YAG laser: 1 mJ to 6 mJ per one pulse and focal diameter of laser beam: 0.1 mm to 0.5 mm such that a unit of linear irradiation marks formed in the direction orthogonal to the rolling, direction in a dotted line-like pattern with an interval of 0.2 mm to 0.6 mm therebetween is repeatedly formed in the rolling direction with an interval or 2 mm to 10 mm between adjacent units.

The method characteristically carries out the unique strain-imparting treatment to a grain oriented electrical steel sheet after annealing for secondary recrystallization and formation of a tension insulating coating, as described above. Accordingly, regarding materials of the grain oriented electrical steel sheet, those for use in the conventional grain oriented electrical steel sheet suffice. For example, materials containing Si: 2.0 mass % to 8.0 mass % for use in an electrical steel may be used, Si: 2.0 Mass % to 8.0 Mass %

Silicon is an element which effectively increases electrical resistance of steel to improve iron loss properties thereof. A silicon content in steel equal to or higher than 2.0 mass % ensures a particularly good effect of reducing iron loss. On the other hand, an Si content in steel equal to or lower than 8.0 mass % ensures particularly good formability and magnetic flux density of a resulting steel sheet. Accordingly, Si content in steel is preferably 2.0 mass % to 8.0 mass %, Specific examples of basic components and other components to be optionally added to material steel for the grain oriented electrical steel sheet are as follows.

C: 0.08 Mass % or Less

Carbon is added to improve texture of a hot rolled steel sheet. The carbon content in steel is preferably 0.08 mass % or less because a carbon content exceeding 0.08 mass % increases burden of reducing the carbon content during the manufacturing process to 50 mass ppm or less at which magnetic aging is reliably prevented. The lower limit of carbon content in steel need not be particularly set because secondary recrystallization is possible in a material not containing carbon.

Mn: 0.005 Mass % to 1.0 Mass %

Manganese is an element which advantageously achieves good hot-formability of a steel sheet. A manganese content in a steel sheet less than 0.005 mass % cannot cause the good effect of Mn addition sufficiently. A manganese content in a steel sheet equal to or lower than 1.0 mass % ensures particularly good magnetic flux density of a product steel sheet. Accordingly, the Mn content in a steel sheet is preferably 0.005 mass % to 1.0 mass %, When an inhibitor is to be used for facilitate secondary recrystallization, the chemical composition of the material steel for the grain oriented electrical steel sheet may contain, for example, appropriate amounts of Al and N in a case where an AlN-based inhibitor is utilized or appropriate amounts of Mn and Se and/or S in a case where MnS and/or MnSe-based inhibitor is utilized. Both AlN-based inhibitor and MnS and/or MnSe-based inhibitor may be used in combination, of course. When inhibitors are used as described above, the contents of Al, N, S and Se are preferably Al: 0.01 mass % to 0.065 mass %. N: 0.005 mass % to 0.012 mass %, S: 0.005 mass % to 0.03 mass %, and Se: 0.005 mass % to 0.03 mass %, respectively.

Our device and method are also applicable to a grain oriented electrical steel sheet not using any inhibitor and material steel thereof having restricted Al, N, S, or Se content. In this case, the contents of Al, N, S and Se are preferably suppressed to Al: 100 mass ppm or less, N: 50 mass ppm or less, S: 50 mass ppm or less, and Se: 50 mass ppm or less, respectively.

Further, the material steel for the grain oriented electrical steel sheet may contain, for example, the following elements as magnetic properties improving components in addition to the basic components described above.

At Least One Element Selected from Ni: 0.03 Mass % to 1.50 Mass %. Sn: 0.01 Mass % to 1.50 Mass %, Sb: 0.005 Mass % to 1.50 Mass %, Cu: 0.03 Mass % to 3.0 Mass %. P: 0.03 Mass % to 0.50 Mass %. Mo: 0.005 Mass % to 0.10 Mass %, and Cr: 0.03 Mass % to 1.50 Mass %

Nickel is a useful element in terms of further improving texture of a hot rolled steel sheet and thus magnetic properties of a resulting steel sheet. A nickel content in steel less than 0.03 mass % cannot cause this magnetic properties-improving effect by Ni sufficiently. A nickel content in steel equal to or lower than 1.5 mass % ensures stability in secondary recrystallization to improve magnetic properties of a resulting steel sheet. Accordingly, the Ni content in steel is preferably 0.03 mass % to 1.5 mass %.

Sn, Sb. Cu, P, Cr and Mo are useful elements, respectively, in terms of further improving magnetic properties of the grain oriented electrical steel sheet. Contents of these elements lower than the respective lower limits described above result in an insufficient magnetic properties-improving effect. Contents of these elements equal to or lower than the respective upper limits described above ensure the optimum growth of secondary recrystallized grains. Accordingly, it is preferable that the grain oriented electrical steel sheet contains at least one of Sn, Sb, Cu, P, Cr and Mo within the respective ranges thereof specified above.

The balance other than the aforementioned components of the grain oriented electrical steel sheet is Fe and incidental impurities incidentally mixed thereinto during the manufacturing, process.

EXAMPLES

In a device to improve iron loss properties of a grain oriented electrical steel sheet having thickness of 0.23 mm and subjected to finish annealing and coating and baking of tension insulating coating by continuously feeding the steel sheet (strip) and irradiating the steel sheet with laser, how the distance L and the angle θ affect contamination of a laser beam irradiator was investigated. The structure of this device to improve iron loss properties of a grain oriented electrical steel sheet was basically the same as the structure shown in FIG. 1. The grain oriented electrical steel sheets used in Examples and Comparative Examples were conventional, highly grain oriented electrical steel sheets each having Si content of 3.4 mass %, magnetic flux density ($B_8$) at 800 A/m of 1.93 T or 1.7 T and exhibiting iron loss at 50 Hz ($W_{17/50}$) of 0.90 W/kg, and a conventional tension insulating coating provided thereon by baking coating liquid composed of colloidal silica, magnesium phosphate and chromic acid, applied on a forsterite coating, at 840° C.

Figure 2:
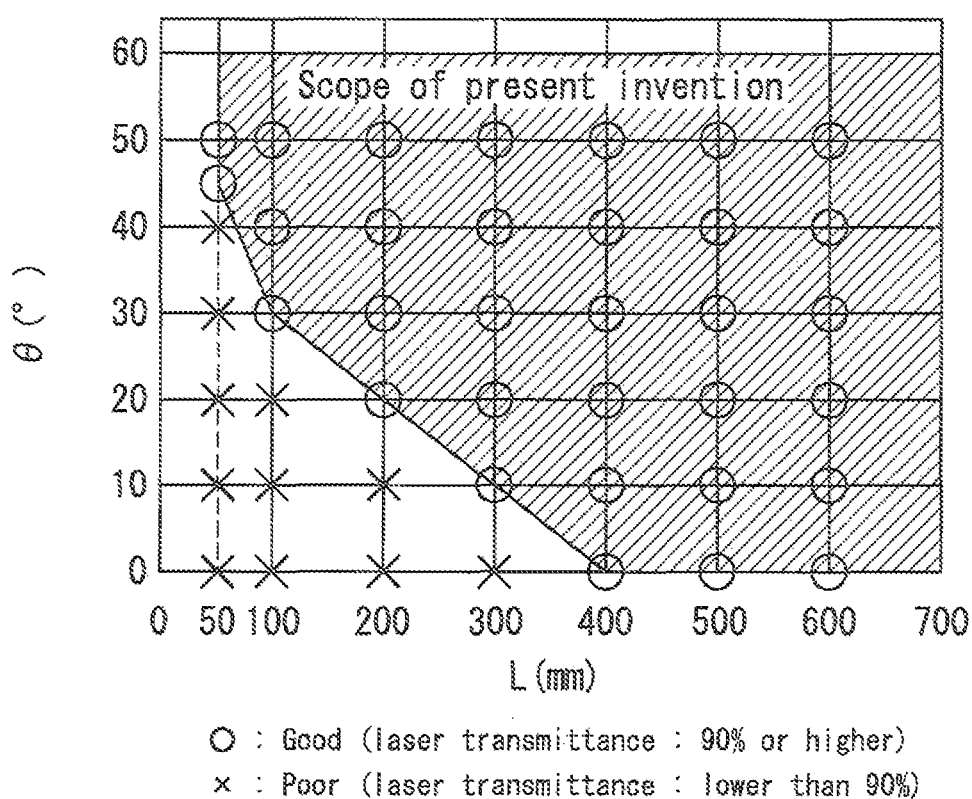
FIG. 2 is a graph showing relationships between degree of contamination of cover glass of a laser beam irradiator and the distance L and the angle θ.

The device to improve iron loss properties included as a laser oscillator a Q-switched pulsed YAG laser. The laser oscillator irradiated the steel sheet with a laser by a galvanometer scanner under the conditions of output per pulse: 4 mJ, beam diameter: 0.3 mm, pulse repetition frequency: 25 kHz such that laser irradiation marks took on dotted lines each extending over 120 mm in a direction orthogonal to the rolling direction with between-spot interval of 0.4 mm and between-line interval of 5 mm. The coating at each laser beam irradiation point evaporated and came off by the laser irradiation. This laser irradiation was continuously carried out for four days and then the degree of contamination of the cover glass of the laser beam irradiator was investigated. When transmittance of the laser beam was 90% or higher, performance was evaluated to be good, while transmittance of the laser beam lower than 90% was evaluated to be poor. The experiment results thus obtained are shown in FIG. 2, It is understood from the results in FIG. 2 that good control of contamination was possible when the distance L and the angle θ were set according to our ranges, respectively.

The average value of iron loss $W_{17/50}$ was 0.75 W/kg when the continuous laser irradiation was started and the value remained the same (i.e., 0.75 W/kg) after the four-day continuous laser irradiation in the grain oriented electrical steel sheets subjected to the method/device having L and θ within our scope. In contrast, the average value of iron loss $W_{17/50}$ was 0.75 W/kg when the continuous laser irradiation was started, but the performance deteriorated, i.e., the average value of iron loss $W_{17/50}$ rose to 0.80 W/kg, or higher after the four-day continuous laser irradiation in the grain oriented electrical steel sheets subjected to the method/device of Comparative Examples having L and θ outside our scope. The investigation on the steel sheet materials conducted after the laser irradiation treatments revealed that iron loss properties deteriorated in Comp. Examples because laser irradiation energy dropped therein. For reference, the poor average values of iron loss $W_{17/50}$ after the laser irradiation treatments of Comp. Examples improved to 0.75 W/kg when the contaminated cover glasses of the laser beam irradiators thereof were cleaned and the same continuous laser irradiations as before were repeated.

INDUSTRIAL APPLICABILITY

According to our method and device, iron-loss reducing treatment by laser irradiation can be carried out stably for a long period, whereby a grain oriented electrical steel sheet product of high quality can be stably provided and increase in production cost and decrease in production efficiency can be reliably avoided.

The invention claimed is:

1. A device that improves iron loss properties of a grain oriented electrical steel sheet having been subjected to finish annealing by irradiating a surface of the grain oriented electrical steel sheet with a laser to reduce iron loss of the electrical steel sheet, comprising a laser irradiator having a laser beam emission port wherein, a distance between the laser beam emission port of the laser beam irradiator emitting laser and a laser beam irradiation point on the electrical steel sheet is L (mm); a laser beam irradiation angle formed by a line linking the laser beam emission port and the laser beam irradiation point with respect to a direction vertical to the electrical steel sheet is θ (°); and L≤50, the laser beam emission port is positioned such that L and θ satisfy:

60−0.3L≤θ≤60 when L≤100

40−0.1L≤θ≤60 when 100<L≤400

θ≤60 when L>400.

2. A method of improving iron loss properties of a grain oriented electrical steel sheet having been subjected to finish annealing by irradiating a surface of the grain oriented electrical steel sheet with a laser to reduce iron loss of the electrical steel sheet, wherein, a distance between a laser beam emission port of a laser beam irradiator emitting the laser and a laser beam irradiation point on the electrical steel sheet is L (mm); a laser beam irradiation angle formed by a line linking the laser beam emission port and the laser beam irradiation point with respect to a direction vertical to the electrical steel sheet is $\theta$ (°); and $L \geq 50$, the method comprising positioning the laser beam emission port such that $L$ and $\theta$ satisfy:

$60 - 0.3L \leq \theta \leq 60$ when $L \leq 100$ $40 - 0.1L \leq \theta \leq 60$ when $100 < L \leq 400$ $\theta \leq 60$ when $L > 400$.

* * * * *